US008168287B2

(12) United States Patent
Law et al.

(10) Patent No.: US 8,168,287 B2

(45) Date of Patent: May 1, 2012

(54) FUSER MEMBER

(75) Inventors: Kock-Yee Law, Penfield, NY (US); Hong Zhao, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 29 days.

(21) Appl. No.: 12/712,221

(22) Filed: Feb. 25, 2010

(65) Prior Publication Data

US 2011/0206902 A1 Aug. 25, 2011

(51) Int. Cl.

| | |
|---|---|
| ***B32B 3/00*** | (2006.01) |
| ***B32B 3/30*** | (2006.01) |
| ***B32B 1/08*** | (2006.01) |
| ***G03G 15/20*** | (2006.01) |

(52) U.S. Cl. ..................... 428/161; 428/36.91; 428/172; 399/333

(58) Field of Classification Search .................. 399/329, 399/330, 333; 430/124.33; 432/60; 428/36.91, 428/172, 327, 161; 355/285, 282; 358/1.13, 358/503

See application file for complete search history.

(56) References Cited

U.S. PATENT DOCUMENTS

| | | | | |
|---|---|---|---|---|
| 5,753,348 | A * | 5/1998 | Hatakeyama et al. | 428/195.1 |
| 7,491,435 | B2 * | 2/2009 | Gervasi et al. | 428/36.91 |
| 2005/0003203 | A1 * | 1/2005 | Brown | 428/413 |

FOREIGN PATENT DOCUMENTS

JP 11184284 A * 7/1999

OTHER PUBLICATIONS

Japense machine translation for JP 11184284 A. Jul. 9, 1999.*

* cited by examiner

*Primary Examiner* — David Sample

*Assistant Examiner* — Nancy Rosenberg

(74) *Attorney, Agent, or Firm* — Hoffman Warnick LLC

(57) ABSTRACT

The present teachings provide a fuser member. The fuser member includes a substrate, a functional layer disposed on the substrate, and an outer layer disposed on the functional layer. The outer layer includes silicon having a texture, and a conformal oleophobic coating disposed on the silicon.

11 Claims, 6 Drawing Sheets

FUSER MEMBER

BACKGROUND

1. Field of Use

This disclosure is generally directed to fuser members useful in electrophotographic imaging apparatuses, including digital, image on image, and the like. In addition, the fuser member described herein can also be used in transfix apparatus in solid ink jet printing machine.

2. Background

In the electrophotographic printing process, a toner image can be fixed or fused upon a support (e.g., a paper sheet) using a fuser roll. Conventional fusing technologies apply release agents/fuser oils to the fuser roll during the fusing operation, in order to maintain good release properties of the fuser roll. For example, oil fusing technologies have been used for all high speed products in the entry production and production color market.

Extending oil-less fusing technologies to high speed printers, such as 100 pages per minute (ppm) or faster, while meeting a series of stringent system requirements such as image quality, parts cost, reliability, long component life, etc. remains technically challenging.

In addition, in oil-less fusing, waxy toner is often used to aid release of the toner image. Consequently, however, wax can be transferred to the fuser surface (e.g., a PTFE surface) and thus contaminate the fuser surface when using the conventional PTFE surface. For example, one frequently mentioned failure mode for PTFE oil-less fuser is called wax ghosting. The wax on the PTFE affects the image quality of the next print.

SUMMARY

According to an embodiment, a fuser member is provided. The fuser member includes a substrate, a functional layer disposed on the substrate and an outer layer disposed on the functional layer. The outer layer includes silicon having a texture, and a conformal oleophobic coating disposed on the silicon.

According to another embodiment, there is described a fuser member including a substrate and an outer amorphous silicon layer. The outer amorphous silicon layer has a texture and is disposed on the substrate. The texture comprises grooves or pillars within about 20 nm to about 10 μm of the surface of the silicon layer. A conformal oleophobic coating is on the silicon layer.

According to another embodiment there is provided a fuser member. The fuser member includes a substrate, a silicone layer disposed on the substrate and a silicon layer disposed on the silicone layer. The silicon layer comprises a textured pattern of grooves or pillars. A fluorosilane coating is disposed on the silicon layer and the resulting fluorinated textured silicon surface has hexadecane contact angle greater than 100° and a sliding angle of less than 30°.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
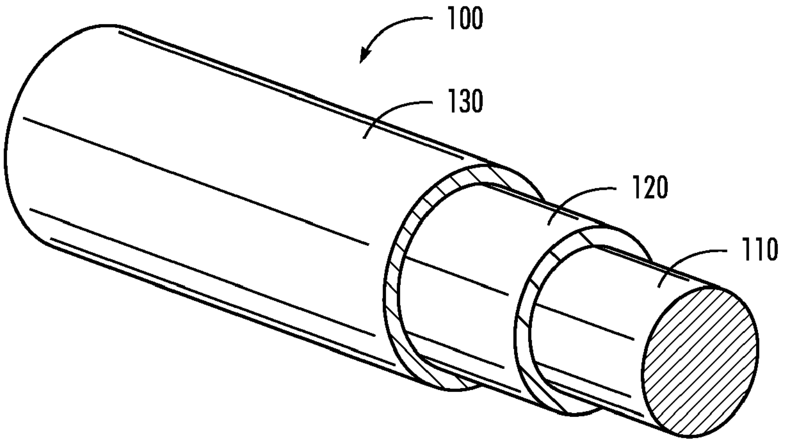
FIG. 1 depicts an exemplary fusing member having a cylindrical substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The fixing member can include a substrate having one or more functional layers formed thereon. The substrate can include, e.g., a cylinder or a belt. The one or more functional layers includes an outermost or top silicon textured surface having a surface wettability that is hydrophobic and/or oleophobic; ultrahydrophobic and/or ultraoleophobic; or superhydrophobic and/or superoleophobic by forming textured features in the silicon. Such fixing member can be used as an oil-less fusing member for high speed, high quality electrophotographic printing to ensure and maintain a good toner release from the fused toner image on an image supporting material (e.g., a paper sheet), and further assist paper stripping. In another embodiment, the silicon textured surface can provide an oil-free, such as wax-free, toner design for the oil-less fixing process.

As used herein, the term "hydrophobic/hydrophobicity" and the term "oleophobic/oleophobicity" refer to the wettability behavior of a surface that has, e.g., a water and hexadecane (or hydrocarbons, silicone oils, etc.) contact angle of approximately 90° or more, respectively. For example, on a hydrophobic/oleophobic surface, a ~10-15 μL water/hexadecane drop can bead up and have an equilibrium contact angle of approximately 90° or greater.

As used herein, the term "ultrahydrophobicity/ultrahydrophobic surface" and the term "ultraoleophobic/ultraoleophobicity" refer to wettability of a surface that has a more restrictive type of hydrophobicity and oleophobicity, respectively. For example, the ultrahydrophobic/ultraoleophobic surface can have a water/hexadecane contact angle of about 120° or greater.

In addition, the term "superhydrophobicity/superhydrophobic surface" and the term "superoleophobic/superoleophobicity" refer to wettability of a surface that has a even more restrictive type of hydrophobicity and oleophobicity, respectively. For example, a superhydrophobic/superoleophobic surface can have a water/hexadecane contact angle of approximately 150 degrees or greater and have a ~10-15 μL water/hexadecane drop roll freely on the surface tilted a few degrees from level. The sliding angle of the water/hexadecane drop on a superhydrophobic/superoleophobic surface can be about 10 degrees or less. On a tilted superhydrophobic/superoleophobic surface, since the contact angle of the receding surface is high and since the interface tendency of the uphill side of the drop to stick to the solid surface is low, gravity can overcome the resistance of the drop to slide on the surface. A superhydrophobic/superoleophobic surface can be described as having a very low hysteresis between advancing and receding contact angles (e.g., 40 degrees or less). Note that larger drops can be more affected by gravity and can tend to slide easier, whereas smaller drops can tend to be more likely to remain stationary or in place.

In various embodiments, the fixing member can include, for example, a substrate, with one or more functional layers formed thereon. The substrate can be formed in various shapes, e.g., a cylinder (e.g., a cylinder tube), a cylindrical drum, a belt, or a film, using suitable materials that are non-conductive or conductive depending on a specific configuration, for example, as shown in FIGS. 1 and 2.

Figure 2:
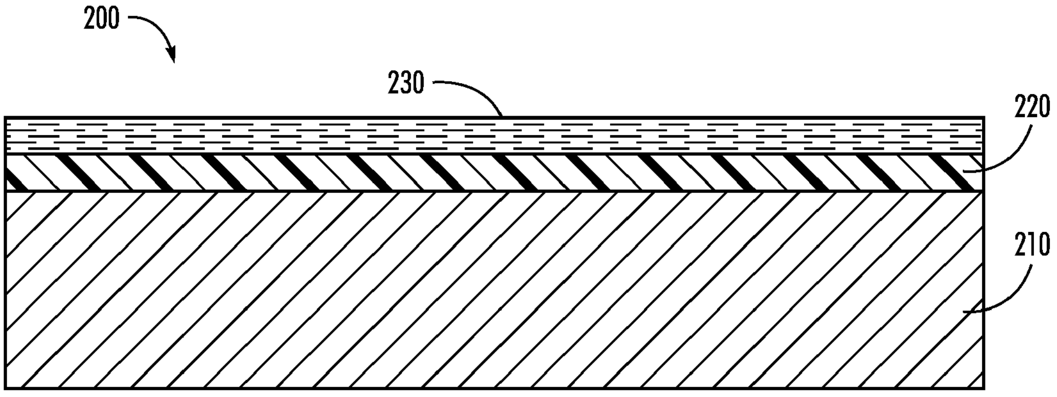
FIG. 2 depicts an exemplary fusing member having a belt substrate in accordance with the present teachings.

Specifically, FIG. 1 depicts exemplary a fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1 the exemplary fixing member 100 can be fuser rollers having a cylindrical substrate 110 with one or more functional layers 120 and an outer layer 130 formed thereon. The outer layer 130 comprises silicon having a texture and a conformal oleophobic coating disposed on the silicon. This oleophobic coating is typically one to two mono molecular layers in thickness with thickness ranging from 1 nm to 10 nm. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon. The outer surface 230 or layer comprises silicon having a texture and a conformal oleophobic coating disposed on the silicon. This oleophobic coating is typically one to two mono molecular layers in thickness with thickness ranging from 1 nm to 10 nm. The belt substrate 210 and the cylindrical substrate 110 can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes), metal materials (e.g., aluminum or stainless steel) to maintain rigidity and structural integrity as known to one of ordinary skill in the art.

Examples of functional layers 120 and 220 include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Examples of functional layers 120 and 220 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, NH®, P757®, TNS®, T439®, PL958®, BR9151® and TN505® available from Ausimont.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GF® have about 35 weight percent of vinylidenefluoride, about 34 weight percent of hexafluoropropylene, and about 29 weight percent of tetrafluoroethylene, with about 2 weight percent cure site monomer.

For roll configuration, the thickness of the functional layer can be from 0.5 mm to 10 mm. For belt, the functional layer can be from 25 microns up to about 1 to about 2 mm.

Optionally, any known and available suitable adhesive layer may be positioned between the silicon layer, the functional layer and the substrate. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

As shown in FIGS. 1 and 2, the textured outer layers of silicon with a conformal coating 130 and 230 can be superhydrophobic or superoleophobic as described herein. For example, the outer layers 130 and 230 can have a water contact angle of about 120° to about 175°, or from about 130° to about 170°, or from about 140° to about 160°. In addition, the outer layers can have a hexadecane contact angle from about 100° to about 175° or from about 110° to about 170° or from about 120° to about 160°. The outer layers can have a sliding angle in the range from about 1° to less than 30°, or from about 1° to less than 25°, or from about 1° to less than 20°.

In embodiments, the difference between the contact angle on the fusing surface and the contact angle on the support for a toner can be greater than 30, or greater than 40 or greater than 50. The greater the difference the better the transfer of the toner to the paper or support.

Figure 3A:
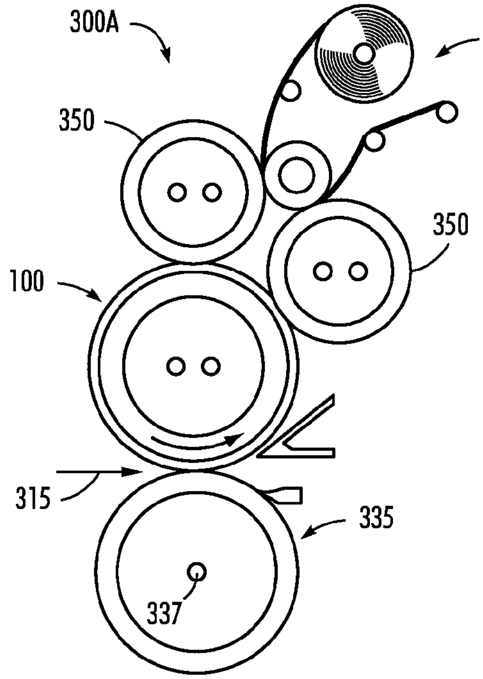
FIGS. 3A-3B depict exemplary fusing configurations using the fuser rolls shown in FIG. 1 in accordance with the present teachings.
Figure 3B:
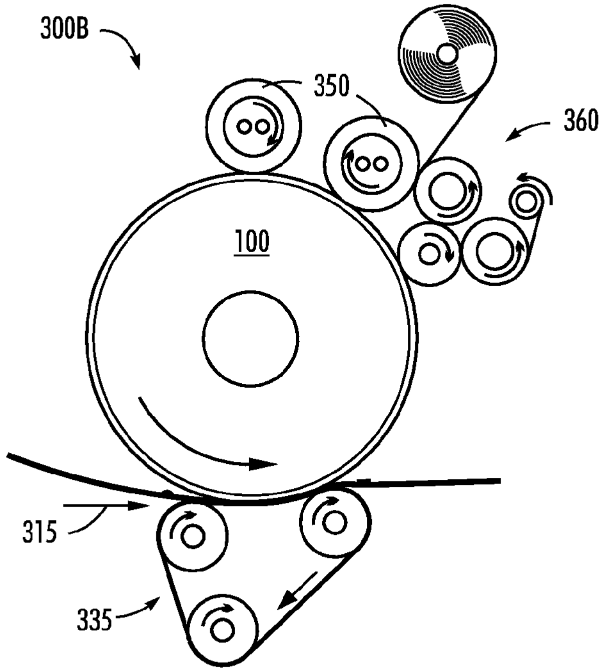
Figure 4A:
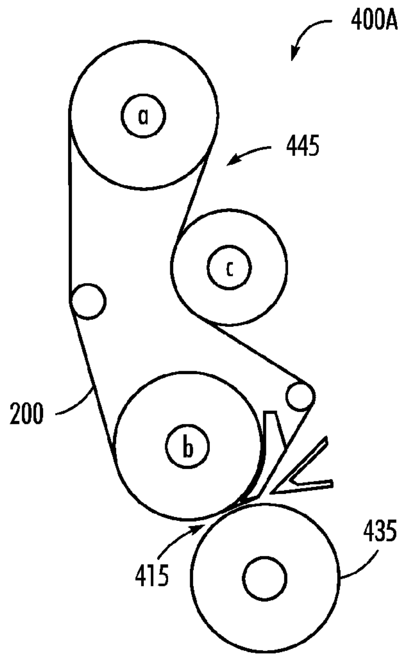
FIGS. 4A-4B depict another exemplary fusing configurations using the fuser belt shown in FIG. 2 in accordance with the present teachings.
Figure 4B:
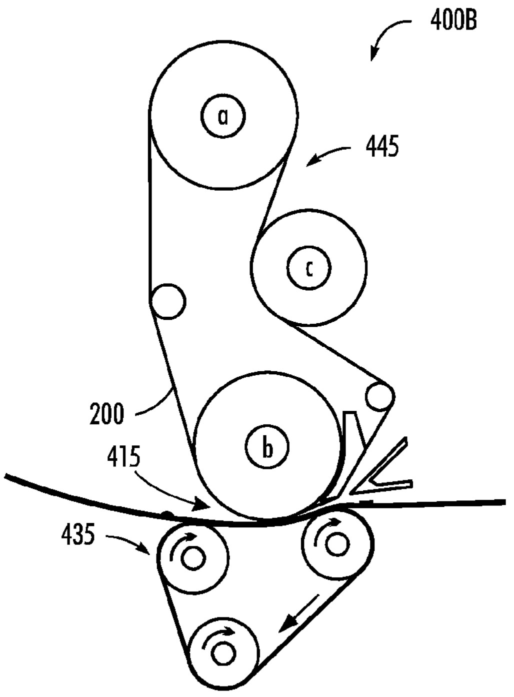

FIGS. 3A-4B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roll shown in FIGS. 1A-1B in accordance with the present teachings. The configurations 300A-B can include a fuser roll 100 (i.e., 100 of FIG. 1) that forms a fuser nip with a pressure applying mechanism 335, such as a pressure roll in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roll 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roll in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fusing the toner particles and forming images on the media substrate 415. The mechanical system 445 can include one or more rolls 445*a-c*, which can also be used as heat rolls when needed.

Figure 5:
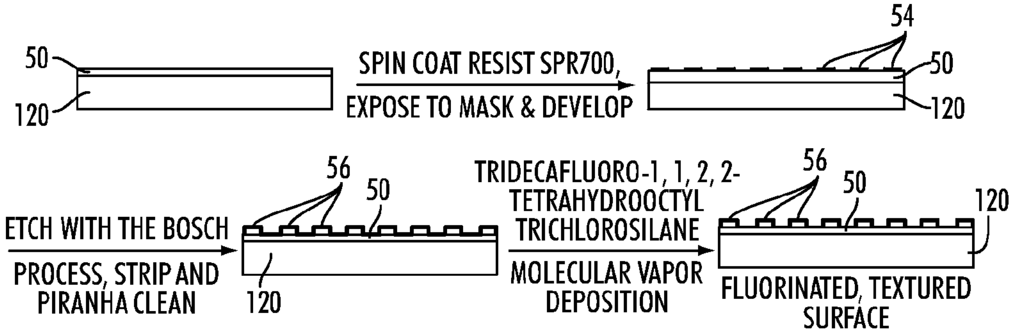
FIG. 5 is an illustration of a process scheme for preparing a fluorinated, textured surface on a functional layer of a fuser member in accordance with the present disclosure.

Referring to the embodiments in FIG. 5, the fuser member having an outer surface herein can be prepared by depositing a thin layer of silicon, such as by sputtering, amorphous silicon 50 onto the functional layer 120. The functional layers were described previously. The thin layer of silicon can be any suitable thickness. In embodiments, the silicon layer can be deposited onto the functional layers at a thickness of from 0.3 to 5 microns and from 1 to 4 microns and from 1.5 microns to 3 microns.

The silicon layer 50 can be deposited onto the functional layers 120 by any suitable method. In embodiments, a silicon thin film is deposited using sputtering or chemical vapor deposition, very high frequency plasma-enhanced chemical vapor deposition, microwave plasma-enhanced chemical vapor deposition, plasma-enhanced chemical vapor deposition and use of ultrasonic nozzles in an in-line process, among others. Textured patterns comprising a groove structure, in embodiments micrometer sized grooves, can be provided on the flexible substrate. In embodiments, the groove structure comprises textured or wavy patterned vertical side walls and an overhang re-entrant structure defined on the top surface of the groove structure, or a combination thereof. Textured or wavy side walls as used herein can mean roughness on the sidewall which is manifested in the submicron range. In embodiments, the wavy side walls can have a 250 nanometer wavy structure with each wave corresponding to an etching cycle as described herein below.

Textured patterns comprising an array of pillars or a groove structure can be provided on the functional layer using photolithography techniques. The array of pillars can be defined as an array of pillars having textured or wavy patterned vertical side walls, having an overhang re-entrant structure defined on the top of the pillars, or a combination thereof. Textured or wavy side walls as used herein can mean roughness on the sidewall which is manifested in the submicron range. In embodiments, the wavy side walls can have a 250 nanometer wavy structure with each wave corresponding to an etching cycle as described herein below. The groove structure comprises textured or wavy patterned vertical side walls and an overhang re-entrant structure defined on the top surface of the groove structure, or a combination thereof. Textured or wavy side walls as used herein can mean roughness on the sidewall which is manifested in the submicron range. In embodiments, the wavy side walls can have a 250 nanometer wavy structure with each wave corresponding to an etching cycle as described herein below. The pillars or groove structure have a height or depth from the base silicon layer of from about 0.25 to about 5 μm, or from about 0.3 to about 4 μm or from about 0.5 to about 2 μm.

Textured patterns comprising an array of pillars or a groove structure can be created on the silicon coated substrate using photolithography techniques. For example as depicted in FIG. 5, the silicon layer 50 on the functional layer 102 can be prepared and cleaned in accordance with known photolithographic methods. A photo resist 54 can then be applied, such as by spin coating or slot die coating the photo resist material 54 onto the silicon layer 50. Any suitable photo resist can be selected. In embodiments, the photo resist can be Mega™Posit™ SPR™ 700 photo resist available from Rohm and Haas.

The photo resist 54 can then be exposed and developed according to methods as known in the art, typically by exposure to ultraviolet light and exposure to an organic developer such as a sodium hydroxide containing developer or a metal-ion free developer such as tetramethylammonium hydroxide.

A textured pattern comprising an array of pillars or a groove structure 56 can be etched by any suitable method as known in the art. Generally, etching can comprise using a liquid or plasma chemical agent to remove layers of the silicon that are not protected by the mask 54. In embodiments, deep reactive ion etching techniques can be employed to produce the pillar arrays 56.

After the etching process, the photo resist can be removed by any suitable method. For example, the photo resist can be removed by using a liquid resist stripper or a plasma-containing oxygen. In embodiments, the photo resist can be stripped using an $O_2$ plasma treatment such as the GaSonics Aura 1000 ashing system available from Surplus Process Equipment Corporation, Santa Clara, Calif. Following stripping, the substrate can be cleaned, such as with a hot piranha cleaning process.

After the surface texture is created on the silicon, the silicon can be chemically modified. Chemically modifying the silicon texture as used herein can comprise any suitable chemical treatment of the silicon, such as to provide or enhance the oleophobic quality of the textured surface. In embodiments, chemically modifying the textured silicon surface comprises disposing a self assembled layer consisting of perfluorinated alkyl chains onto the textured silicon surface. A variety of technologies, such as the molecular vapor deposition technique, the chemical vapor deposition technique, or the solution coating technique can be used to deposit the self assembled layer of perfluorinated alkyl chains onto the textured silicon surface. In embodiments, chemically modifying the textured substrate comprises chemical modification by self-assembling a fluorosilane coating onto the textured surface conformally via a molecular vapor deposition technique, a chemical vapor deposition technique, or a solution self assembly technique. In a specific embodiment, chemically modifying the textured substrate comprises disposing layers assembled by tridecafluoro-1,1,2,2-tetrahydrooctyltrichlorosilane, tridecafluoro-1,1,2,2-tetrahydrooctyltrimethoxysilane, tridecafluoro-1,1,2,2-tetrahydrooctyltriethoxysilane, heptadecafluoro-1,1,2,2-tetrahydrooctyltrichlorosilane, heptadecafluoro-1,1,2,2-tetrahydrooctyltrimethoxysilane, heptadecafluoro-1,1,2,2-tetrahydrooctyltriethoxysilane, or a combination thereof, and the like, using the molecular vapor deposition technique or the solution coating technique.

In a specific embodiment, the Bosch deep reactive ion etching process comprising pulsed or time-multiplexed etching is employed to create the textured surface comprising arrays of pillars or the groove structure. The Bosch process can comprise using multiple etching cycles with three separate steps within one cycle to create a vertical etch: 1) deposition of a protective passivation layer, 2) Etch 1, an etching cycle to remove the passivation layer where desired, such as at the bottom of the valley, and 3) Etch 2, an etching cycle to etch the silicon isotropically. Each step lasts for several seconds. The passivation layer is created by $C_4F_8$ which is similar to Teflon® and protects the entire substrate from further chemical attack and prevents further etching. However, during the Etch 1 phase, the directional ions that bombard the substrate attack the passivation layer where desired. For the pillars, the directional ions are not directed along the pillar side walls. The ions collide with the passivation layer and sputter it off, exposing the bottom of the valley on the substrate to the chemical etchant during Etch 2. Etch 2 serves to etch the silicon isotropically for a short time (for example, from about 5 to about 10 seconds). A shorter Etch 2 step gives a smaller wave period (5 seconds leads to about 250 nanometers) and a longer Etch 2 yields longer wave period (10 seconds leads to about 880 nanometers). This etching cycle can be repeated until a desirable pillar or groove height is obtained. For the pillar structure, pillars can be created having a textured or wavy sidewall wherein each wave corresponds to one etching cycle. For the groove structure, photolithography comprises using multiple etching cycles to create a vertical etch wherein each of the multiple etching cycles comprises a) depositing a protective passivation layer, b) etching to remove the passivation layer where desired, and c) etching the silicon isotropically; and d) repeating steps “a” through “c” until a desirable groove structure configuration is obtained. In this process, a groove structure can be created having a textured or wavy sidewall, wherein each wave corresponds to one etching cycle. In embodiments, the groove structure includes wavy sidewalls, an overhang re-entrant structure, or a combination thereof.

The size of the periodic “wave” structure can be any suitable size. In specific embodiments herein, the size of each “wave” of the wavy sidewall is from about 100 nanometers to about 1,000 nanometers, or about 250 nanometers.

Figure 6:
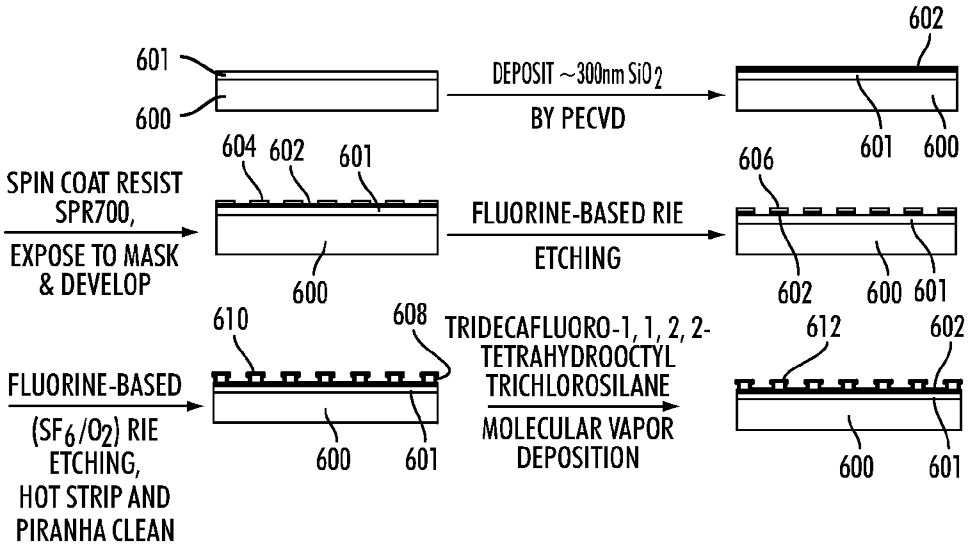
FIG. 6 is an illustration of an embodiment of a process scheme for preparing a fluorinated, textured surface on a functional layer of a fuser member in accordance with the present disclosure.

Turning to FIG. 6, an embodiment of the present process comprises creating a textured surface on a flexible substrate comprising an array of pillars or a groove structure having overhang re-entrant structures. The process can comprise an analogous process using a combination of two fluorine etchings processes ($CH_3F/O_2$ and $SF_6/O_2$). Referring to FIG. 6, the process can comprise providing a functional layer 600 having disposed thereon a cleaned silicon layer 601, depositing an $SiO_2$ thin film 602 on the cleaned silicon layer 601, such as via sputtering or plasma enhanced chemical vapor deposition, applying a photo resist material 604 to the silicon oxide 602 coated silicon layer 601 on the functional layer 600, exposing and developing the photo resist material 604, such as with 5:1 photolithography using SPR™ 700-1.2 photo resist, using fluorine based reactive ion etching ($CH_3F/O_2$) to define a textured pattern in the $SiO_2$ layer comprising an array of pillars or a groove structure 606, using a second fluorine based ($SF_6/O_2$) reactive ion etching process, followed by hot stripping, and piranha cleaning to create the textured pillars or grooves 608 having over hang re-entrant structures 610.

The patterned array can then be coated with a conformal oleophobic coating 612 to provide a superoleophobic flexible device comprising a textured pattern of pillars having straight side walls and overhang re-entrant structures 610.

In one embodiment, the pillars have heights ranging between about 0.25 μm and about 5 μm, mean diameters between about 0.5 μm and about 6 μm, ranging between about 0.5 μm and about 4 μm. In an additional example, the surface features can have a height or depth ranging from about 0.3 microns to about 4 microns and a lateral dimension of about 1 micron to about 12 microns.

EXAMPLES

Figure 7:
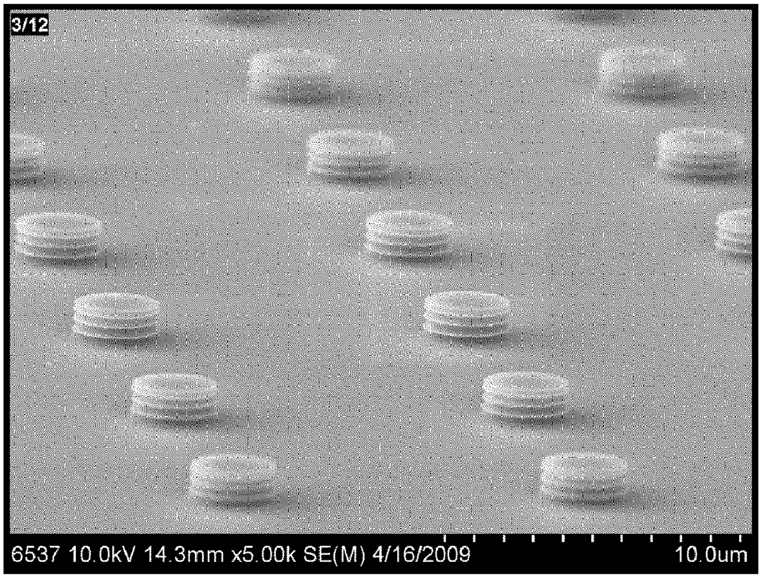
FIG. 7 shows an embodiment of a surface texture in accordance with the present disclosure.
Figure 8:
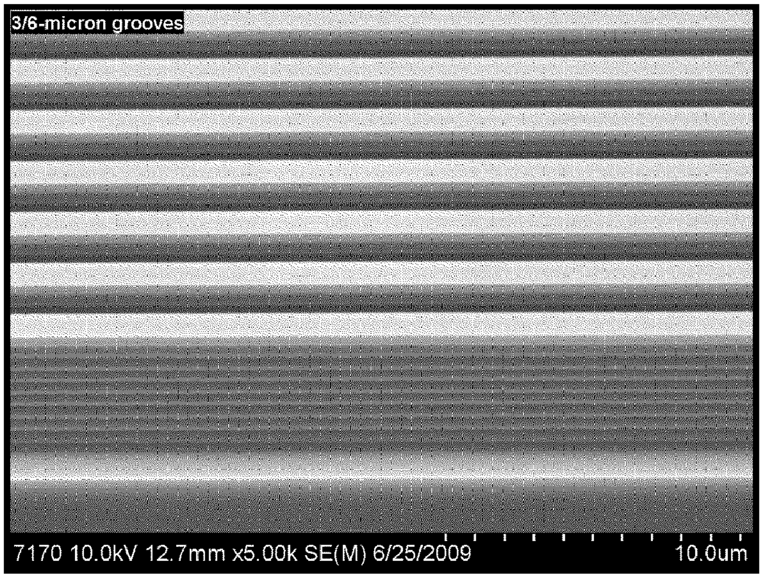
FIG. 8 shows an embodiment of the surface texture in accordance with the present disclosure.

A fuser member having a textured silicon outer surface having a conformal super oleophobic coating reduces toner adhesion, improves offset and increases paper stripping latitude oil less fusing at high speed. Recently, superoleophobic surfaces on silicon were fabricated with hexadecane contact angle >150° and sliding angle <10°. These surfaces were fabricated by first creating a texture on the silicon surface using photolithography, followed by surface modification with a fluorosilane as described previously. Two kinds of textures, pillar and groove, were fabricated and shown to be effective in producing superoleophobic surfaces. The surface textures are depicted in FIGS. 7 and 8. FIG. 7 shows a fluorosilane coated pillar structured surface (~3 μm diameter, ~1 μm height and 12 μm pitch). FIG. 8 shows a fluorosilane coated silicon grooved structure (~3 μm in width, ~4 μm in height and ~6 μm in pitch). The coated textured silicon surface is mechanically robust and can resist seriously rubbing. The groove structure improves mechanical robustness as well. The hexadecane contact angle data for these two surfaces are included in Table 1, again showing extremely high contact angles.

TABLE 1

| Sample | Water | | Hexadecane | | Solid ink (~105° C.) | |
|---|---|---|---|---|---|---|
| | Contact angle | Sliding angle | Contact angle | Sliding angle | Contact angle | Sliding angle |
| PTFE film | ~118° | ~64° | ~48° | ~31° | ~63° | >90° |
| Superoleophobic Surface (pillar structure with 3 μm dia./6 μm pitch) | ~156° | ~10° | ~158° | ~10° | ~155° | ~33°-58° |
| Superoleophobic Surface (groove structure with 3 μm width/6 μm pitch, parallel direction) | ~131° | ~8° | ~113° | ~4° | ~120° | ~25° |
| Superoleophobic Surface (groove structure with 3 μm width/6 μm pitch, Orthogonal direction) | ~154° | ~23° | ~162° | ~34° | ~156° | >90° |

In one embodiment, the grooves have depths ranging between about 0.3 μm and about 5 μm. In an additional example, the surface features can have a height or depth ranging from about 0.3 microns to about 4 microns and a lateral dimension of about 1 micron to about 12 microns.

The disclosed hydrophobic/oleophobic silicon textured surface can be used in oil-less fusing processes to assist toner release and paper stripping, as well as to improve toner design.

Such oil-less fusing can provide many more advantages. For example, the elimination of the entire oil delivering system in a fuser system can provide lower manufacture cost, lower operating cost (e.g., due to no oil-replenishment), simpler subsystem design and lighter weight. In addition, an oil-free fusing process/operation can overcome, e.g., non-uniform oiling of the fuser that generates print streaks and unacceptable image quality defect, and some machine reliability issue (e.g., frequent breakdown) that generates high service cost and customer dissatisfaction.

To be able to de-wet, the liquid droplet should have a high contact angle on a given surface. Similarly, a small contact angle between a liquid droplet and the surface usually will enable good wetting and spreading. For fusing or transfixing applications, in order to achieve no offset on the fuser surface, it is desirable for the molten toner or ink to have a very high contact angle on the fuser surface while wetting the paper at the same time. In other words, one would like to have a large contact angle on the fuser surface and a small contact angle on paper. The difference in contact angle would become a figure-of-merit in fuser/transfuser design; the larger the contact angle difference, the better the offset performance will be. Table 1 shows that coated silicon surfaces provide an advantage over typical fluoropolymer surfaces typically used in fuser members.

As shown in Table 2, the contact angle difference between the superoleophobic surface and the transparency with the three imaging materials, ranges from 51° to 115°, are significantly larger than those observed on PTFE. The results provide evidence that if a fuser surface is superoleophobic, significant improvements in release, offset, and paper stripping should be obtained.

TABLE 2

| Surface | Contact angle (sliding angle) Solid ink (105° C.) | Waxy polyester toner (165° C.) | Polyester toner (165° C.) |
|---|---|---|---|
| Superoleophobic (pillar structure with 3 μm dia./6 μm pitch) | ~155° (33°-58°) | ~159° (50°-55°) | ~130° (35°-52°) |
| Transparency (surrogate for paper) | ~40° (>90°) | ~66° (>90°) | ~79° (>90°) |
| PTFE film | ~63° (>90°) | ~75° (>90°) | ~85° (>90°) |
| Contact angle difference between PTFE and transparency | ~23° | ~9° | ~6° |
| Contact angle difference between superoleophobic surface and transparency | ~114° | ~94° | ~51° |

Figure 9:
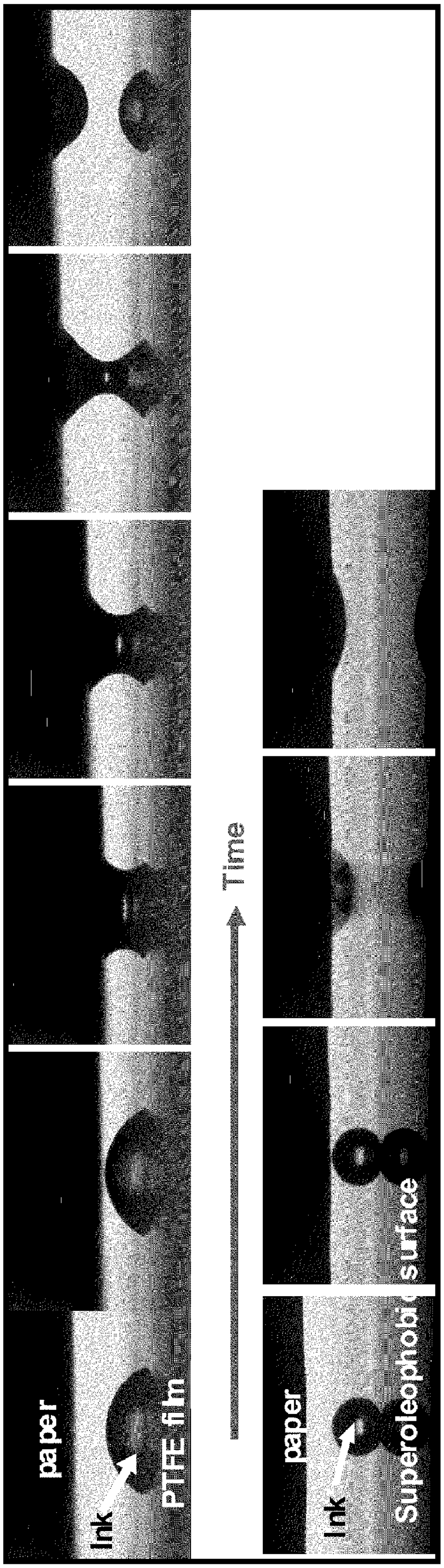
FIG. 9 is a series of photographs showing the manner in which molten ink performs, the upper series shows a PTFE surface and paper and the lower series shows a textured silicon surface and paper.

Further information showing the advantage of the textured silicon surface with the oleophobic coating when compared to PTFE using a waxy polyester toner is provided. The waxy polyester toner in conjunction with a PTFE fuser member is commonly used for oil less fusing. The contact angle Δ for a PTFE fuser and waxy polyester toner is 9° and is significantly smaller than the superoleophobic surface and polyester toner combination, which is 51°. The large contact angle Δ for the superoleophobic surface indicates one may practice oil less fusing at higher printing speeds with a polyester toner free of wax using the textured silicon surface with the oleophobic coating as the fuser member. To validate the superior performance of the textured silicon surface with the oleophobic coating as the fuser member, a simulation showing the interaction between the fuser surface, the molten toner or ink and paper was conducted. In this experiment, a molten droplet of ink was created on the two surfaces, PTFE and the superoleophobic model surfaces, a piece of plain uncoated paper was then brought in contact with the molten ink drop slowly and carefully where video of the entire event was recorded. FIG. 9 depicts the frame-by-frame of the ink offset experiment for the two surfaces. The solid ink drop was found to split between the PTFE surface and paper, implying offset would likely to occur if this was a fusing experiment. In contrast, the solid ink drop was found to behave very differently. Upon contact, the ink drop just "jumps" onto the paper without leaving any residue behind.

Other embodiments of the present teachings will be apparent to those skilled in the art from consideration of the specification and practice of the present teachings disclosed herein. It is intended that the specification and examples be considered as exemplary only, with the true scope and spirit of the present teachings being indicated by the following claims.

What is claimed is:

1. A fuser member comprising:

a substrate;

a functional layer disposed on the substrate, wherein the functional layer is elastic; and an outer layer disposed on the functional layer comprising a silicon layer having a texture wherein the texture comprises grooves comprising wavy sidewalls, an overhang re-entrant structure, or a combination thereof wherein the outer layer comprises a thickness of from about 0.3 microns to about 5 microns, and a conformal oleophobic coating disposed on the silicon layer.

2. The fuser member of claim 1 wherein the grooves have a depth of from about 0.25 microns to about 5 microns.

3. The fuser member of claim 1, wherein the grooves comprise a textured wavy sidewall, and wherein each wave of the wavy sidewall is from about 100 nanometers to about 1,000 nanometers.

4. The fuser member of claim 1, wherein the outer surface comprises a hexadecane contact angle of greater than about 100° to about 175° and a sliding angle of from about 1° to less than 30°.

5. The fuser member of claim 1 wherein a contact angle of the outer layer subtracted from a contact angle of a substrate for a toner particle is greater than 30°.

6. The fuser member of claim 1, wherein the silicon layer comprises amorphous silicon.

7. A fuser member comprising:

a substrate;

an elastic layer disposed on the substrate;

an outer amorphous silicon layer having a texture disposed on the elastic layer wherein the outer amorphous silicon layer comprises a thickness of from about 0.3 microns to about 5 microns, wherein the texture comprises grooves comprising wavy sidewalls, an overhang re-entrant structure, or a combination thereof and wherein the grooves are within about 0.25 μm to about 5 μm of the surface of the silicon layer; and a conformal oleophobic coating on the silicon layer.

8. The fuser member of claim 7 wherein the oleophobic coating comprises fluorosilane.

9. The fuser member of claim 7, wherein the outer surface comprises a hexadecane contact angle of greater than about 100° to about 175° and a sliding angle of from about 1° to less than 30°.

10. A fuser member comprising:

a substrate;

a functional layer disposed on the substrate wherein the functional layer is selected from the group consisting of silicone, fluorosilicone and fluoroelastomer;

a silicon layer disposed on the functional layer wherein the silicon layer comprises a textured pattern comprising grooves comprising wavy sidewalls, an overhang re-entrant structure, or a combination thereof wherein the silicon layer comprises a thickness of from about 0.3 microns to about 5 microns; and a fluorosilane coating disposed on the silicon layer wherein the coating comprises a hexadecane contact angle of greater than about 100° to about 175° and a sliding angle of from about 1° to less than 30°.

11. The fuser member of claim 10 wherein the grooves have a depth of from about 0.25 μm to about 5 μm.

* * * * *